United States Patent
Lee et al.

(10) Patent No.: US 11,386,674 B2
(45) Date of Patent: Jul. 12, 2022

(54) CLASS LABELING SYSTEM FOR AUTONOMOUS DRIVING

(71) Applicant: HYUNDAI MOBIS Co., Ltd., Seoul (KR)

(72) Inventors: Dong Yul Lee, Yongin-si (KR); Jin Aeon Lee, Yongin-si (KR); Ho Pyong Gil, Yongin-si (KR); Byung Min Kim, Yongin-si (KR); Sang Woo Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 16/809,540

(22) Filed: Mar. 4, 2020

(65) Prior Publication Data
US 2020/0285866 A1 Sep. 10, 2020

(30) Foreign Application Priority Data
Mar. 8, 2019 (KR) ........................ 10-2019-0027201

(51) Int. Cl.
*G06V 20/56* (2022.01)
*G06K 9/62* (2022.01)
(Continued)

(52) U.S. Cl.
CPC ......... *G06V 20/588* (2022.01); *G06K 9/6257* (2013.01); *G06K 9/6263* (2013.01);
(Continued)

(58) Field of Classification Search
CPC . G06K 9/00791–00825; G06K 9/6257; G06K 9/6263; G06K 9/6268;
(Continued)

(56) References Cited

U.S. PATENT DOCUMENTS

2012/0166033 A1 6/2012 Byun et al.
2018/0246521 A1 8/2018 Seo et al.
(Continued)

FOREIGN PATENT DOCUMENTS

JP 2016-126613 7/2016
KR 10-2012-0072020 7/2012
(Continued)

OTHER PUBLICATIONS

Kyung-Min Lee, An Image Based Autonomous Driving System using Deep Learning, Computer Science Master's Thesis for Semyung University Graduate School, Aug. 2018, pp. 1-51, Semyung University Graduate School, Jecheon-si, Korea.

*Primary Examiner* — Casey L Kretzer
(74) *Attorney, Agent, or Firm* — H.C. Park & Associates, PLC (57) ABSTRACT

A class labeling system for autonomous driving includes a detection module, a segmentation module, and a lane road boundary detection module. The detection module is configured to detect objects for autonomous driving from an image captured by a camera to generate a bounding box for each of the objects and detect property information about the object. The segmentation module is configured to determine classes for each pixel of the bounding box detected by the detection module and process at least one of the classes as don't care. The lane road boundary detection module is configured to detect at least one of lane and road boundaries using the bounding box detected by the detection module.

14 Claims, 8 Drawing Sheets

(51) Int. Cl.
    *G06T 7/12*          (2017.01)
    *G06V 10/44*       (2022.01)
    *G06V 10/22*       (2022.01)
    *G06V 10/24*       (2022.01)
    *G06V 20/58*       (2022.01)

(52) U.S. Cl.
    CPC .............. *G06K 9/6268* (2013.01); *G06T 7/12* (2017.01); *G06V 10/235* (2022.01); *G06V 10/242* (2022.01); *G06V 10/44* (2022.01); *G06V 20/582* (2022.01)

(58) Field of Classification Search
    CPC .. G06V 20/588; G06V 20/582; G06V 10/235; G06V 10/242; G06V 10/44; G06T 7/12
    See application file for complete search history.

(56) References Cited

U.S. PATENT DOCUMENTS

| | | | | |
|---|---|---|---|---|
| 2019/0095722 | A1* | 3/2019 | Kang | ............... G06T 7/215 |
| 2020/0160552 | A1* | 5/2020 | Hashimoto | .......... G06K 9/6274 |
| 2020/0242373 | A1* | 7/2020 | Mei | ............... G06N 3/0454 |

FOREIGN PATENT DOCUMENTS

| | | |
|---|---|---|
| KR | 10-20150084234 | 7/2015 |
| KR | 10-2018-0097966 | 9/2018 |

\* cited by examiner

| NO | Class | Description | Output |
|---|---|---|---|
| 1 | Vehicle | Vehicle Detection & Classification | BB, TID, 3D BB |
| 2 | Indicator Status | Vehicle Lamp Signal Recognition | SID |
| 3 | Pedestrian | Pedestrian Detection & Classification | BB, TID, 3D BB |
| 4 | Hand Gesture | Hand Gesture Recognition | T.B.D. |
| 5 | Cyclist | Cyclist Detection & Subcategory Classification | BB, TID, 3D BB |
| 6 | Motorcyclist | Motorcyclist Detection & Classification | BB, TID, 3D BB |
| 7 | Headlight / Taillight | Headlight/Taillight Detection | BB |
| 8 | Unknown Moving Object | Unknown Moving Objects Detection | BB, TID, 3D BB |
| 9 | Traffic Sign | Traffic Sign Detection | BB, SID, Distance |
| 10 | Traffic Light | Traffic Light Detection | BB, SID, Distance |
| 11 | Structural Element | Road Structure Detection | BB, SID, Distance |
| 12 | Road Hazard | Road Hazard Detection | BB, SID, Distance |
| 13 | Road Roughness | Road Roughness Detection | BB, SID, Distance |
| 14 | Road Surface | Road surface Recognition | SID |
| 15 | Lane | Lane Detection | B-Spline, SID, Instance Segment |
| 16 | Road Boundary | Road Boundary Detection & Classification | B-Spline, SID, Instance Segment |
| 17 | Road Marking | Road marking Detection | SID, Instance Segment |
| 18 | Free-space | Drivable Free Space Detection | Instance Segment |

CLASS LABELING SYSTEM FOR AUTONOMOUS DRIVING

CROSS-REFERENCE TO RELATED APPLICATION

This application claims priority to and the benefit of Korean Patent Application No. 10-2019-0027201, filed Mar. 8, 2019, which is hereby incorporated by reference for all purposes as if fully set forth herein.

BACKGROUND

Field

Exemplary embodiments generally relate to a class labeling system for autonomous driving, and more particularly, to a class labeling system for autonomous driving that accurately recognizes and automatically labels classes for autonomous driving of a vehicle based on deep learning.

Discussion

In autonomous driving, image recognition recognizes various objects, such as vehicles, pedestrians, traffic lights, lanes, crosswalks, etc., and is aimed at various properties, such as the relative location, speed, and size of each object. Due to the diversity of objects and properties, image recognition has more difficulty as compared to other recognition fields. It, however, is predicted that the difficulty in the field of image recognition in autonomous driving will also be able to be solved (or at least reduced) by deep learning technology if there is sufficient diversity and retention of learning data. However, it is difficult to acquire learning data because of different geographical and legal characteristics between countries. By way of example, it is difficult to directly utilize learning data, such as cityscape or KITTI, in domestic roads because the learning data is very different from domestic road conditions.

Despite the importance of data acquisition, a strategy to acquire a recognition object range and a learning data technology acquisition for autonomous driving is unclear or limited to the development of some major technologies, with the exception of several advanced companies. In particular, data is inefficiently labeled using a manual annotation tool in most cases. In this case, considerable resources are consumed due to the trouble of re-annotating according to a required labeling method or a change in laws and regulations.

It is recognized that ApolloScape and Berkeley Deep-Drive (BDD) datasets have been published through a semi-automated annotation tool. The semi-automated annotation tool is innovative to label the most widely used cityscape and KITTI, but it still lacks the objects of recognition because it is only intended to detect major objects. For instance, the semi-automated annotation tool excludes information necessary for driving, such as a traffic sign or a vehicle lamp, from the detection objects, compared to humans, and continuously consumes considerable human and time resources in annotating.

A conventional image processing method for autonomous driving is disclosed in Korean Patent Application Publication No. 10-2018-0097966, published Sep. 3, 2018, and entitled "Image Processing Method for Autonomous Driving and Apparatus Thereof."

The above information disclosed in this section is only for understanding the background of the inventive concepts, and, therefore, may contain information that does not form prior art.

SUMMARY

Some aspects provide a class labeling system for autonomous driving that is capable of accurately recognizing and automatically labeling classes for autonomous driving of a vehicle based on deep learning.

Additional aspects will be set forth in the detailed description which follows, and, in part, will be apparent from the disclosure, or may be learned by practice of the inventive concepts.

According to some aspects, a class labeling system for autonomous driving includes a detection module, a segmentation module, and a lane road boundary detection module. The detection module is configured to detect objects for autonomous driving from an image captured by a camera to generate a bounding box for each of the objects and detect property information about the object. The segmentation module is configured to determine classes for each pixel of the bounding box detected by the detection module and process at least one of the classes as don't care. The lane road boundary detection module is configured to detect at least one of lane and road boundaries using the bounding box detected by the detection module.

In an embodiment, the detection module may include a detection unit, a classification task unit, an instance segmentation task unit, a distance value regression task unit, and a tracking task unit. The detection unit may be configured to detect the objects by analyzing the image captured by the camera and detect the bounding box for each of the objects. The classification task unit may be configured to detect a sub-property of each object detected with the bounding box by the detection unit. The instance segmentation task unit may be configured to crop the bounding box detected by the detection unit to detect a pixel related to the object in the bounding box. The distance value regression task unit may be configured to use a distance value input from a light detection and ranging (LiDAR) to detect a distance to the object in the bounding box detected by the detection unit. The tracking task unit may be configured to predict a location of at least one of a vehicle and a pedestrian detected with the bounding box by the detection unit.

In an embodiment, the detection unit may be configured to detect in-image coordinates for locations of objects to receive the bounding box.

In an embodiment, the in-image coordinates may be expressed by a vertex of the bounding box, a width of the bounding box, and a height of the bounding box.

In an embodiment, the vertex may be a left upper end of the bounding box.

In an embodiment, the classification task unit may be configured to detect a sub-property of a sign from among the objects.

In an embodiment, the distance value regression task unit may be configured to extract point cloud coordinate values related to the in-image coordinate values of the bounding box, and determine, among the in-image coordinate values, a value having a minimum distance from an object to a vehicle as the distance value of the object.

In an embodiment, at least one of the classification task unit, the instance segmentation task unit, the distance value regression task unit, and the tracking task unit may be configured to perform shift data augmentation in multiple directions and regions to learn each network.

In an embodiment, at least one of the classification task unit, the instance segmentation task unit, the distance value regression task unit, and the tracking task unit may be configured to learn a network using at least one of zero shot learning, one shot learning, and low shot learning techniques.

In an embodiment, at least one of the classification task unit, the instance segmentation task unit, the distance value regression task unit, and the tracking task unit may be configured to learn a network by an ensemble technique using at least one of left rotation, right rotation, and flip rotation.

In an embodiment, the segmentation module may include a segmentation unit configured to determine the classes of each pixel of the image captured by the camera, and a don't care processing unit configured to process at least one of the classes determined by the segmentation unit as don't care.

In an embodiment, the don't care processing unit may be configured to: detect a bounding box determined as don't care from an original image to generate a segmentation image; learn a dataset of the segmentation image and a dataset labeled by a human labeler to compare performance evaluation results; and perform repetitive learning until the dataset of the segmentation image is improved more than the dataset labeled by the human labeler in recognition performance according to the performance evaluation results.

In an embodiment, the lane road boundary detection module may include a free instance segmentation unit and a B-spline detection unit. The free instance segmentation unit is may be configured to output a pixel-wise class and an instance output from the image captured by the camera using an instance deep learning network. The B-spline detection unit may be configured to detect a B-spline for lane or road shapes through the pixel-wise class and the instance output that are output from the free instance segmentation unit.

According to various exemplary embodiments, a class labeling system for autonomous driving can automatically obtain high-quality learning data for autonomous driving. In addition, the class labeling system for autonomous driving can prevent (or at least mitigate) the trouble of re-annotating according to a labeling method or a change in laws and regulations by performing automated labeling without using an existing manual annotation tool, and can significantly increase the production speed of learning data as compared to using the existing manual annotation tool. Further, the class labeling system for autonomous driving can recognize all objects for autonomous driving, even in common road environments, such as paved, unpaved, suburban, urban roads, etc., and a variety of weather conditions. Moreover, the class labeling system for autonomous driving can minimize (or at least reduce) the time to regenerate annotation data even when a data specification has changed through a deep learning-based automatic inferencing technique.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF SOME EXEMPLARY EMBODIMENTS

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching, shading, and/or line thickness in the accompanying drawings is generally provided to clarify boundaries between adjacent elements. As such, neither the presence nor the absence of cross-hatching, shading, and/or line thicknesses indicates any preference or requirement for particular materials, material properties, dimensions, proportions, commonalities between illustrated elements, and/or any other characteristic, attribute, property, etc., of the elements, unless specified. Also, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments may be described herein with reference to sectional views, isometric views, perspective views, plan views, and/or exploded depictions that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments of a class labeling system for autonomous driving will be described with reference to the accompanying drawings.

Figure 1:
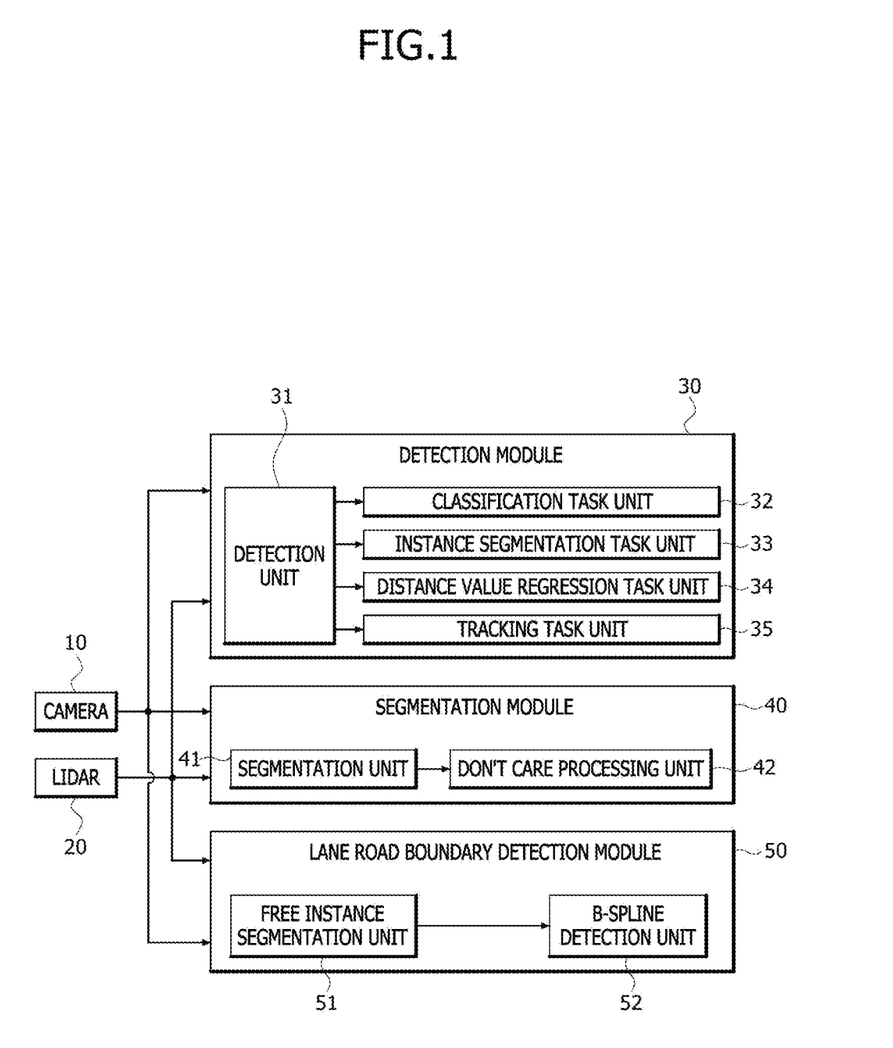
FIG. 1 is a block diagram illustrating a class labeling system for autonomous driving according to some exemplary embodiments.
Figure 2:
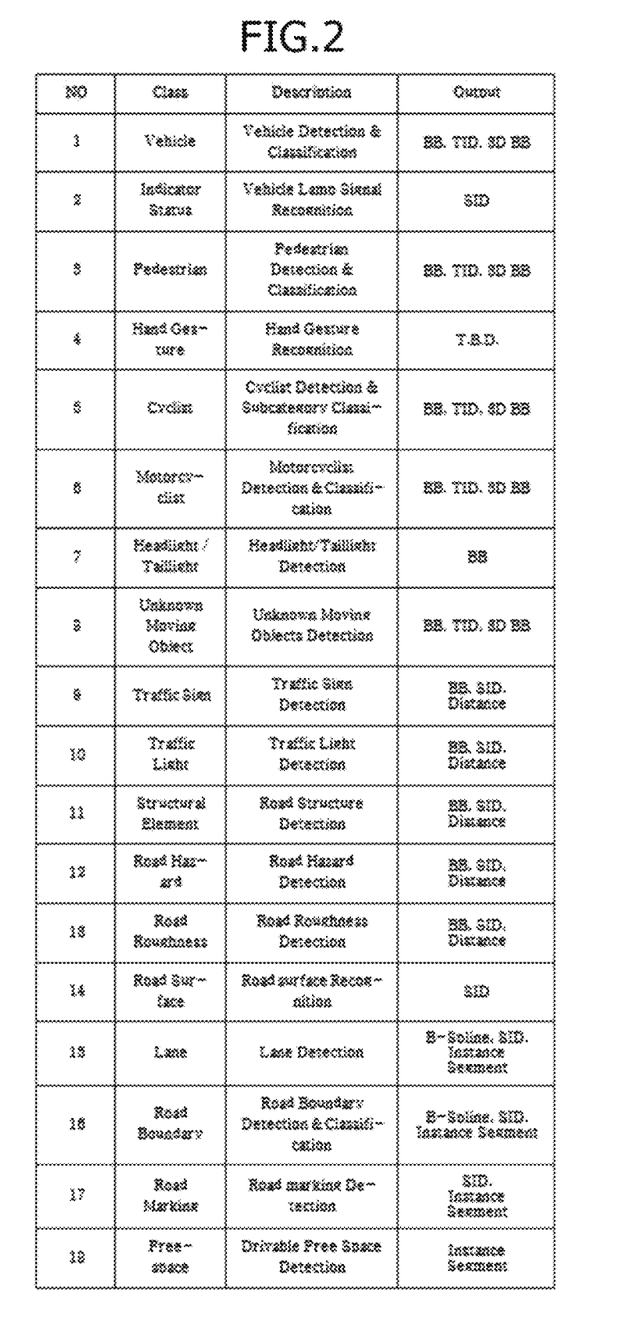
FIG. 2 is an exemplary diagram of classes according to some exemplary embodiments.
Figure 3:
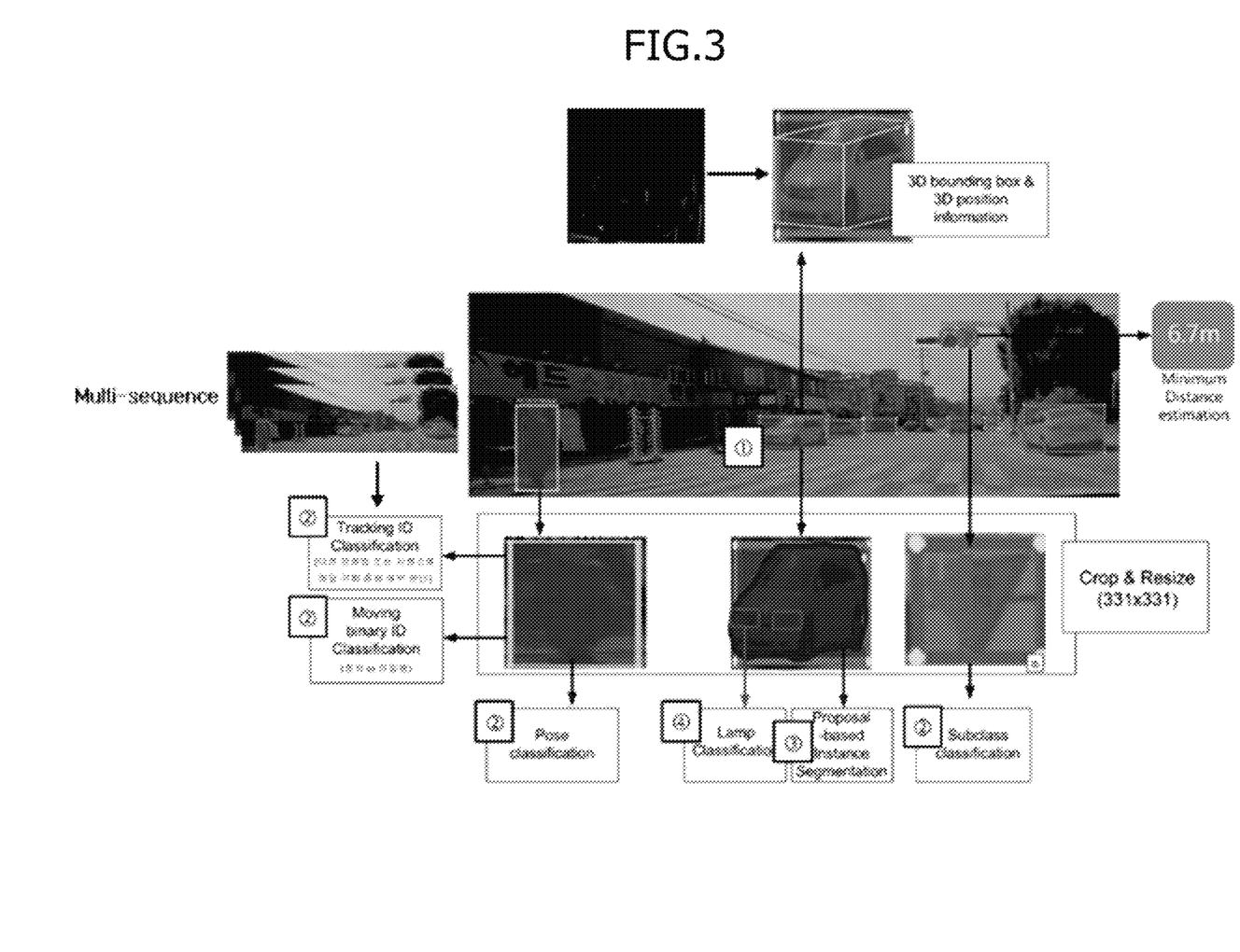
FIG. 3 is a view illustrating an example of objects detected by an in-image bounding box according to some exemplary embodiments.
Figure 4:
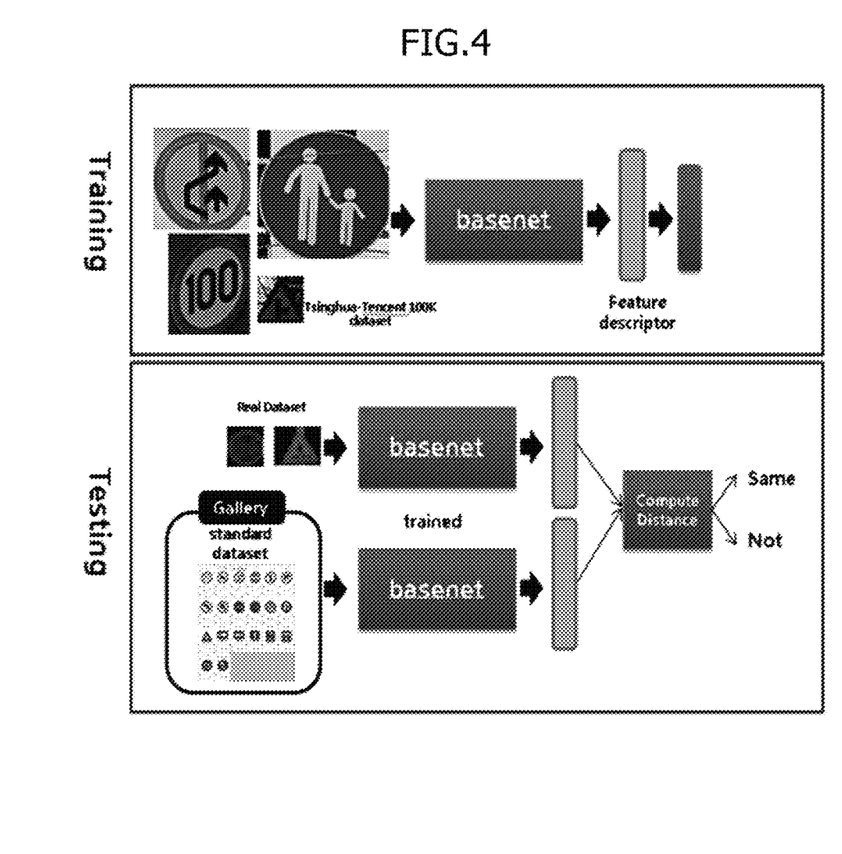
FIG. 4 is a view illustrating an example of detecting a sub-property of objects detected by the in-image bounding box according to some exemplary embodiments.
Figure 5:
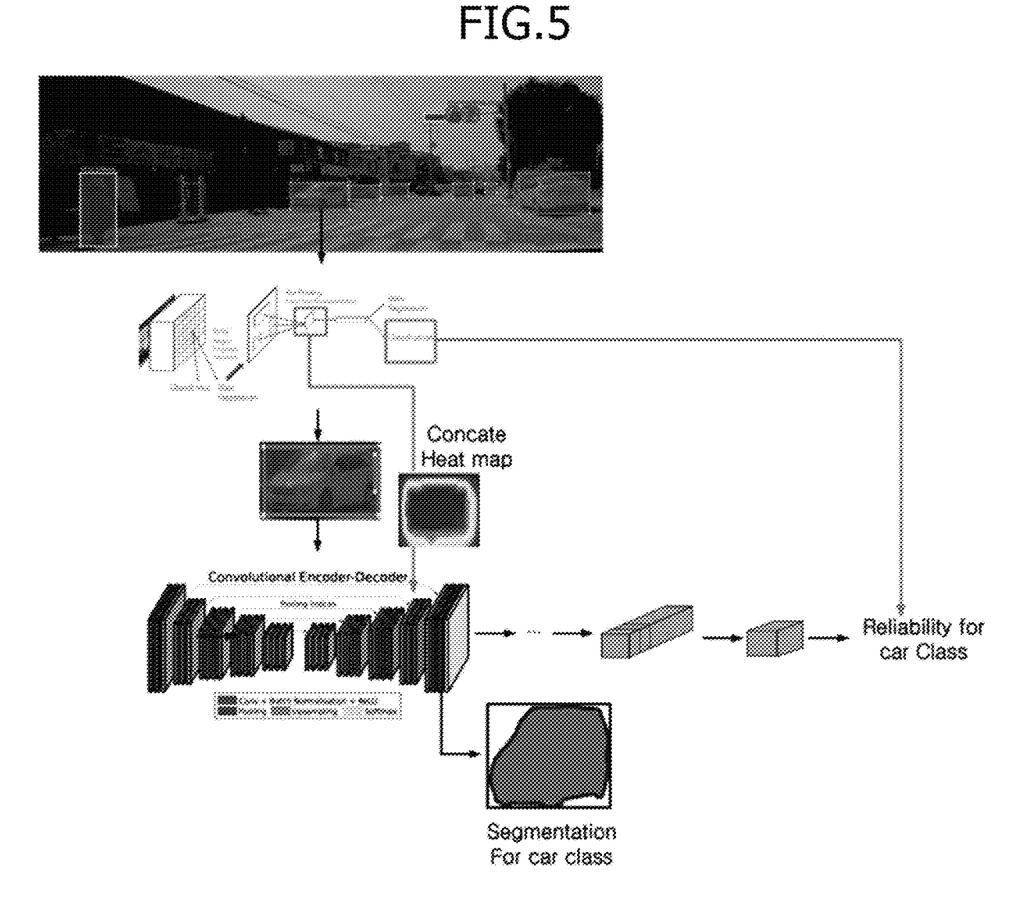
FIG. 5 is a view illustrating an example of known prior-based segmentation according to some exemplary embodiments.
Figure 6:
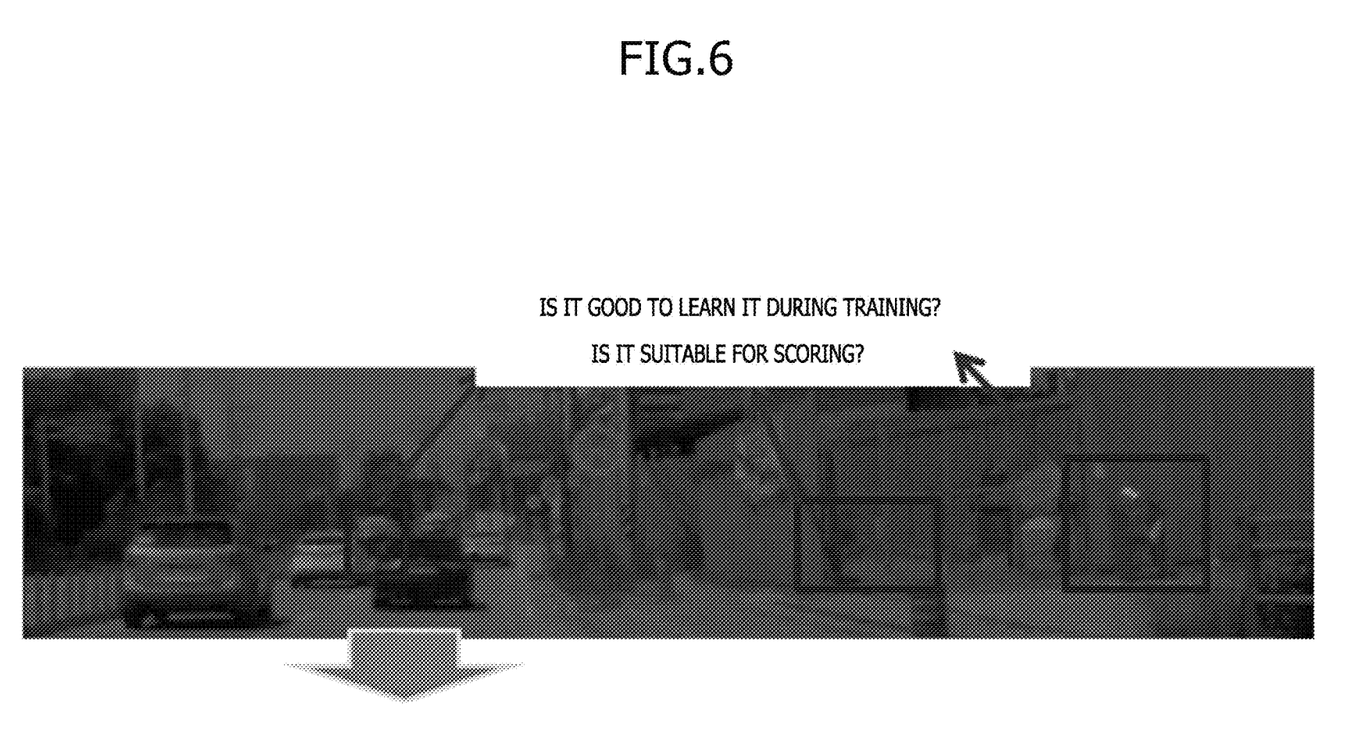
FIG. 6 is a view illustrating an example of a don't care object according to some exemplary embodiments.

FIG. 1 is a block diagram illustrating a class labeling system for autonomous driving according to some exemplary embodiments. FIG. 2 is an exemplary diagram of classes according to some exemplary embodiments. FIG. 3 is a view illustrating an example of objects detected by an in-image bounding box according to some exemplary embodiments. FIG. 4 is a view illustrating an example of detecting a sub-property of objects detected by the in-image bounding box according to some exemplary embodiments. FIG. 5 is a view illustrating an example of known prior-based segmentation according to some exemplary embodiments. FIG. 6 is a view illustrating an example of a don't care object according to some exemplary embodiments.

Figure 7:
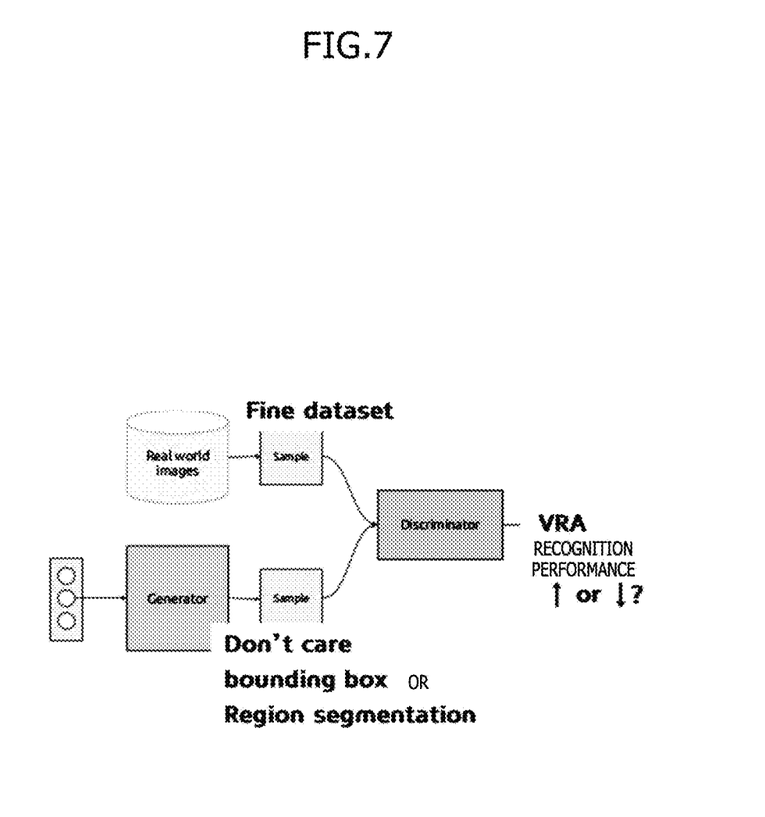
FIG. 7 is a view conceptually illustrating an operation of a don't care processing unit according to some exemplary embodiments.
Figure 8:
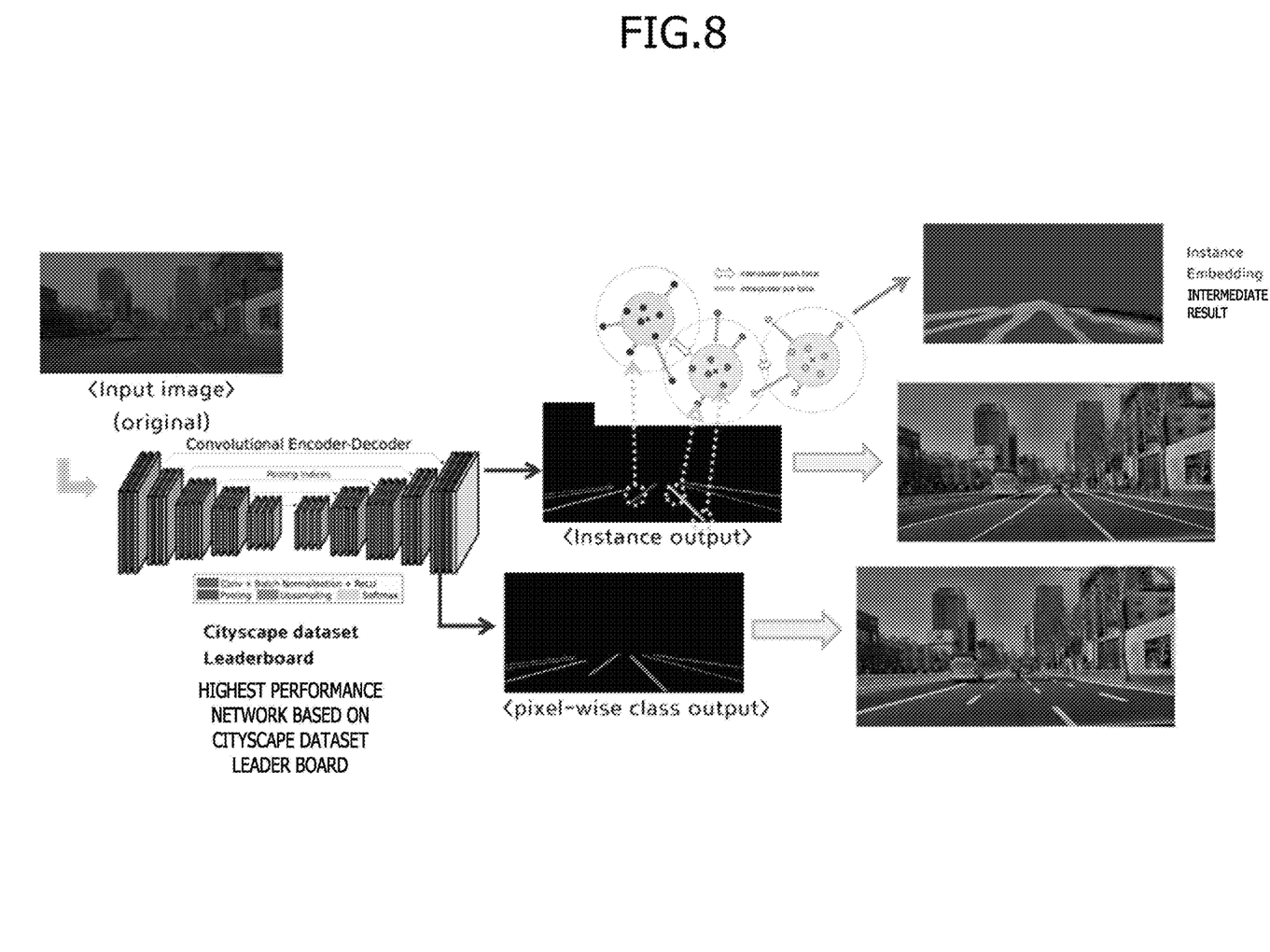
FIG. 8 is a view conceptually illustrating an operation of a lane road boundary detection unit according to some exemplary embodiments.

FIG. 7 is a view conceptually illustrating an operation of a don't care processing unit according to some exemplary embodiments. FIG. 8 is a view conceptually illustrating an operation of a lane road boundary detection unit according to some exemplary embodiments.

Referring to FIG. 1, a class labeling system for autonomous driving according to some exemplary embodiments is configured to accurately recognize and automatically label classes for autonomous driving of a vehicle based on deep learning, and includes a camera 10, a light detection and ranging (LiDAR) 20, a detection module 30, a segmentation module 40, and a lane road boundary detection module 50. Various classes classifying objects for autonomous driving of a vehicle are illustrated in FIG. 2.

Referring to FIG. 2, examples of the classes may include a vehicle, an indicator status, a pedestrian, a human pose (or hand gesture), a cyclist, a motorcyclist, a headlight/taillight, an unknown moving object, a traffic sign, a traffic light, a structural element, a road hazard, a road roughness, a road surface, a lane, a road boundary, a road marking, and a free space. The classes are not limited to the aforementioned exemplary embodiments, and may be classified into more detailed classes.

The camera 10 may be installed in (or to) the vehicle to photograph a periphery of the vehicle and input the captured image to at least one of the detection module 20, the segmentation module 40, and the lane road boundary detection module 50.

The camera 10 may consist of a plurality of cameras including a left front camera, a center front camera, a right front camera, and a rear camera. In some exemplary embodiments, the camera 10 may be mounted on the upper side of the inside of the windshield of the vehicle, and a maximum amount of data per hour obtained by the camera 10 may be 480 Terabytes, but exemplary embodiments are not limited thereto.

Examples of the image collected by the camera 10 may include information on the road on which a vehicle is traveling, vehicles around the vehicle, etc., as well as information on surrounding environments, lighting, weather, and the like. For example, the camera 10 may collect information on surrounding geographic features and buildings, road signs, traffic signs, brightness, day and night, and weather, such as sunny days, cloudy days, fog, snow, and rain.

The LiDAR 20 emits light to measure a distance to each object in a vicinity of the vehicle and input the measured distance to at least one of the detection module 20, the segmentation module 40, and the lane road boundary detection module 50. In some exemplary embodiments, a maximum amount of data per hour obtained by the LiDAR 20 may be 46 Terabytes. The LiDAR 20 may be used for location recognition, obstacle detection, and moving object tracking because it may accurately and rapidly obtain a distance to an object therefrom. The LiDAR 20 may obtain distances to a plurality of objects therefrom with one scan by adjusting an angle for emitting light.

The detection module 20 detects an object for autonomous driving from among the objects in the image input from the camera 10 to output a bounding box for the object and detect property information on (or about) the object. The detection module 20 may include a detection unit 31, a classification task unit 32, an instance segmentation task unit 33, a distance value regression task unit 34, and a tracking task unit 35.

As illustrated in FIG. 3, the detection unit 31 detects objects by analyzing the image obtained by the camera 10 and generates a bounding box of the detected object. In this case, the detection unit 31 detects in-image coordinates for the locations of the objects with the detected bounding box.

In some exemplary embodiments, the coordinate value of each bounding box in the image may be expressed by the left upper end of the bounding box and the width and height of the bounding box.

When the bounding box is generated by the detection unit 31 as described above, each of the classification task unit 32, the instance segmentation task unit 33, the distance value regression task unit 34, and the tracking task unit 35 performs training and inferencing on the detected bounding box to detect various types of property information of the corresponding classes. Performing training and inferencing on the bounding box will be described later.

First, as illustrated in FIG. 4, the classification task unit 32 detects a sub-property of each object detected with the bounding box by the detection unit 31. For example, the object, the sub-property of which may be detected by the classification task unit 32, may include a sign, the sub-property of which may be detected by determining whether it is a speed limit sign, a construction guide sign, or the like.

The instance segmentation task unit 33 crops the bounding box detected by the detection unit 31 to classify pixels into a pixel related to and a pixel unrelated to an object, and may detect only the pixels related to the object.

The distance value regression task unit 34 extracts point cloud coordinate values related to the coordinate value of the bounding box detected by the detection unit 31, and determines, among the point cloud coordinate values, a coordinate value having a minimum distance from an object to a vehicle as the distance value of the object.

Typically, in the case of a traffic sign or a traffic light, the information detected by the LiDAR 20 includes a point cloud three-dimensional (3D) coordinate value at a corresponding time.

In various exemplary embodiments, the distance value regression task unit 34 may extract point cloud coordinate values related to the coordinate value of the bounding box using the information detected by the LiDAR 20, and may determine, among the point cloud coordinate values, a value having a minimum distance from an object to a vehicle as the distance value of the object.

The tracking task unit 35 predicts the locations of the vehicle and the pedestrian detected with the bounding box by the detection unit 31. For instance, when the vehicle and the pedestrian are detected with the bounding box by the detection unit 31, the tracking task unit 35 tracks the movement of the vehicle and the pedestrian using multi-image sequence information to predict the future locations and behaviors of the vehicle and the pedestrian.

Here, each of the classification task unit 32, the instance segmentation task unit 33, the distance value regression task unit 34, and the tracking task unit 35 performs training and inferencing on the bounding box to detect the property information described above.

Each of the classification task unit 32, the instance segmentation task unit 33, the distance value regression task unit 34, and the tracking task unit 35 performs the training in a manner of learning each network by performing shift data augmentation in the direction of multi-scale and all regions in order to properly detect all sizes and locations of the objects in the image.

In some exemplary embodiments, each of the classification task unit 32, the instance segmentation task unit 33, the distance value regression task unit 34, and the tracking task unit 35 resizes one image to different sizes to learn the network and also shifts the image in different directions (some images being lost and some images being zero padded during the shift) to learn the network.

In addition, not only does it take a considerable amount of time to acquire real vehicle logging data and labeled data, but it is also difficult to obtain various types of data. As such, each of the classification task unit 32, the instance segmentation task unit 33, the distance value regression task unit 34, and the tracking task unit 35 may obtain various images and labeling data on a scenario basis using a simulation tool. This data is then converted into the domain of real vehicle data and used as a learning image of the network.

One of the biggest drawbacks of supervised learning among deep learning technologies is that too much data is required to learn the data. Thus, each of the classification task unit 32, the instance segmentation task unit 33, the distance value regression task unit 34, and the tracking task unit 35 may perform the inferencing using zero shot learning, one shot learning, and low shot learning techniques. For instance, each of the classification task unit 32, the instance segmentation task unit 33, the distance value regression task unit 34, and the tracking task unit 35 may develop a network using only one image, a zero image (e.g., on the fly), or several images for learning in a situation where there are few images that are usable for network learning. In addition, to extremely improve the performance of the network, each of the classification task unit 32, the instance segmentation task unit 33, the distance value regression task unit 34, and the tracking task unit 35 may improve inferencing performance using ensemble technologies, such as left rotation, right rotation, and flip rotation.

The segmentation module 40 is configured to determine classes of all pixels of an image and process a meaningless one of the classes as "don't care," and includes a segmentation unit 41 and a don't care processing unit 42. The segmentation unit 41 determines classes of all pixels of a segmentation image. The segmentation unit 41 may use a pre-key prior-based deep learning object recognition technique.

In some exemplary embodiments, the pre-key prior-based deep learning object recognition technology is used in different networks by sharing output results between different deep learning networks to increase a network synergy effect in a multi-stage network. As illustrated in FIG. 5, a feature map and class information, which are network intermediate results, are detected, in addition to bounding box information, for each bounding box, in which case the pre-key prior-based deep learning object recognition technology concatenates the feature map and the class information to increase the recognition accuracy of the corresponding region during learning.

The don't care processing unit 42 finds a meaningless one of the regions determined by the segmentation unit 41, namely, a region that may adversely affect image quality or learning, to process the region as "don't care." For example, as illustrated in FIG. 6, it may be difficult to determine whether it is good or bad to use a small vehicle or an object having a low image quality and hard to be labeled by a human for learning, in which case the don't care processing unit 42 determines the small vehicle or the object using deep learning to automatically generate it as "don't care" if there is no need to learn and evaluate it.

In addition, there are backgrounds or unknown dynamic objects in the image in addition to the object. In this case, the don't care processing unit 42 determines whether to use these objects for learning and evaluation or not to use them for learning and evaluation by labeling them as "don't care."

Referring to FIG. 7, in the don't care processing unit 42, a generator detects a bounding box (region or object), which is determined as "don't care," from the original image to generate a segmentation image. In this case, the generator randomly generates a bounding box determined as "don't care" for the initial segmentation image.

A discriminator compares the segmentation image (or dataset) generated as described above with the dataset labeled by a human labeler and improves the performance of the generator according to the result of comparison. For example, the discriminator improves the performance of the generator based on a target embedding network in such a way to compare performance evaluation results after learning the corresponding networks using the previously generated two respective datasets (segmentation image (dataset) and dataset labeled by human labeler), and repeatedly learns the generator until the segmentation image (dataset) is improved more than the dataset generated by the human labeler in recognition performance.

The target embedding network may be a medium or less deep learning network operating under hardware constraints.

The lane road boundary detection module 50 is configured to predict lane and road boundaries using the bounding box detected by the detection unit 31, and includes a free instance segmentation unit 51 and a basis spline (B-spline) detection unit 52.

Referring to FIG. 8, the free instance segmentation unit 51 outputs a pixel-wise class and an instance output from the image captured by the camera 10 using an instance deep learning network of a density-based spatial clustering of applications with noise (DBSCAN) and an end-to-end proposal free scheme.

When the pixel-wise class and the instance output are output by the free instance segmentation unit 51, the B-spline detection unit 52 detects a B-spline for lane or road shapes, e.g., detects control points of a B-spline, through the pixel-wise class and the instance output. The B-spline has a high degree of freedom and may refer to various lane or road shapes.

According to various exemplary embodiments, a class labeling system for autonomous driving can automatically obtain high-quality learning data required for autonomous driving. The class labeling system for autonomous driving according to some exemplary embodiments can prevent (or at least mitigate) the trouble of re-annotating according to a labeling method or a change in laws and regulations by performing automated labeling without using an existing manual annotation tool, and can significantly increase the production speed of learning data compared to using the existing manual annotation tool.

The class labeling system for autonomous driving according to some exemplary embodiments can recognize objects for autonomous driving, even in common road environments (e.g., paved, unpaved, suburban, urban roads, etc.) and a variety of weather conditions. The class labeling system for autonomous driving according to some exemplary embodiments can minimize (or at least reduce) the time to regenerate annotation data even when a data specification is changed through the deep learning-based automatic inferencing.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A class labeling system for autonomous driving, comprising:
a detection module configured to detect objects for autonomous driving from an image captured by a camera to generate a bounding box for each of the objects and to detect property information about each of the objects;
a segmentation module configured to determine classes for each pixel of the bounding boxes detected by the detection module and to process at least one of the classes as don't care; and
a lane road boundary detection module configured to detect at least one of lane and road boundaries using the bounding boxes detected by the detection module,
wherein the detection module comprises:
a detection unit configured to detect the objects;
a distance value regression task unit configured to use a distance value input from a sensor to detect a distance to the object in the bounding box detected by the detection unit; and
a tracking task unit configured to predict a location of at least one of a vehicle and a pedestrian detected with the bounding box by the detection unit.

2. The class labeling system of claim 1, wherein:
the detection unit is configured to detect the objects by analyzing the image captured by the camera and detect the bounding boxes for each of the objects,
the detection module further comprises:
a classification task unit configured to detect a sub-property of each of the objects detected with the bounding boxes by the detection unit; and
an instance segmentation task unit configured to crop the bounding boxes detected by the detection unit to detect pixels related to the objects in the bounding boxes, and
the sensor is a light detection and ranging (LiDAR).

3. The class labeling system of claim 2, wherein the classification task unit is configured to detect a sub-property of a sign from among the objects.

4. The class labeling system of claim 2, wherein at least one of the classification task unit, the instance segmentation task unit, the distance value regression task unit, and the tracking task unit is configured to perform shift data augmentation in multiple directions and regions to learn at least one network.

5. The class labeling system of claim 2, wherein at least one of the classification task unit, the instance segmentation task unit, the distance value regression task unit, and the tracking task unit is configured to learn a network using at least one of zero shot learning, one shot learning, and low shot learning techniques.

6. The class labeling system of claim 2, wherein at least one of the classification task unit, the instance segmentation task unit, the distance value regression task unit, and the tracking task unit is configured to learn a network by an ensemble technique using at least one of left rotation, right rotation, and flip rotation.

7. The class labeling system of claim 1, wherein the detection unit is configured to detect in-image coordinates for locations of the objects to receive the bounding boxes.

8. The class labeling system of claim 7, wherein the in-image coordinates for each respective bounding box are expressed by a vertex of the respective bounding box, a width of the respective bounding box, and a height of the respective bounding box.

9. The class labeling system of claim 8, wherein the vertex is a left upper end of the respective bounding box.

10. The class labeling system of claim 7, wherein the distance value regression task unit is configured to:
extract point cloud coordinate values related to the in-image coordinate values of the bounding boxes; and
determine, among the in-image coordinate values, a value having a minimum distance from each respective object to a vehicle as the distance value of the respective object.

11. The class labeling system of claim 1, wherein the segmentation module comprises:
a segmentation unit configured to determine the classes of each pixel of the image captured by the camera; and
a don't care processing unit configured to process at least one of the classes determined by the segmentation unit as don't care.

12. The class labeling system of claim 11, wherein the don't care processing unit is configured to:
detect a bounding box determined as don't care from an original image to generate a segmentation image;
learn a dataset of the segmentation image and a dataset labeled by a human labeler to compare performance evaluation results; and
perform repetitive learning until the dataset of the segmentation image is improved more than the dataset labeled by the human labeler in recognition performance according to the performance evaluation results.

13. A class labeling system for autonomous driving, comprising:
a detection module configured to detect objects for autonomous driving from an image captured by a camera to generate a bounding box for each of the objects and to detect property information about each of the objects;
a segmentation module configured to determine classes for each pixel of the bounding boxes detected by the detection module and to process at least one of the classes as don't care; and
a lane road boundary detection module configured to detect at least one of lane and road boundaries using the bounding boxes detected by the detection module,
wherein the lane road boundary detection module comprises:
a free instance segmentation unit configured to output a pixel-wise classification and an instance of the image captured by the camera using an instance deep learning network; and
a B-spline detection unit configured to generate a B-spline curve for lane or road shapes through the pixel-wise classification and the instance of the image that are output from the free instance segmentation unit.

14. An apparatus for autonomous driving, the apparatus comprising:
at least one processor; and
at least one memory comprising one or more sequences of one or more instructions that, in response to being executed by the at least one processor, cause the apparatus at least to:
analyze an image to detect objects for autonomous driving;
generate a bounding box for each of the objects, each of the bounding boxes comprising first pixels;

crop each of the bounding boxes to detect second pixels from among the first pixels, the second pixels of a bounding box being related to a corresponding object in the bounding box;
detect property information and a sub-property about each of the objects;
determine classes for each of the first pixels;
process at least one of the classes as being irrelevant with regard to the objects;
receive light detection and ranging (LiDAR) distance input values;
detect distances to the objects using the LiDAR distance input values;
detect at least one of lane and road boundaries using the bounding boxes;
detect at least one of a vehicle and a pedestrian using the bounding boxes; and
predict a location of the at least one of the vehicle and the pedestrian.

* * * * *